United States Patent [19]

Gardner

[11] Patent Number: 4,926,709
[45] Date of Patent: May 22, 1990

[54] MOTION TRANSMITTING SYSTEMS FOR MACHINERY & MACHINE TOOLS

[76] Inventor: James J. Gardner, 700 East Fifth Ave., Lancaster, Ohio 43130

[21] Appl. No.: 194,507

[22] Filed: May 16, 1988

[51] Int. Cl.$^5$ .............................................. F16H 1/10
[52] U.S. Cl. .................................. 74/424.88; 74/89.15
[58] Field of Search .................................. 74/424.8 B

[56] References Cited

U.S. PATENT DOCUMENTS

| | | | |
|---|---|---|---|
| 2,520,014 | 8/1950 | Rehnberg et al. | 74/424.8 B |
| 2,630,022 | 3/1953 | Terdina | 74/424.8 B |
| 2,683,375 | 7/1954 | Gerentes | 74/424.8 B |
| 2,860,266 | 11/1958 | Schrader | 74/424.8 B |
| 3,776,045 | 12/1973 | Faulkner | 74/424.8 B X |
| 3,872,738 | 3/1975 | Price et al. | 74/424.8 B |
| 4,614,128 | 9/1986 | Fickler | 74/424.8 B |

*Primary Examiner*—Allan D. Herrmann
*Assistant Examiner*—Janice E. Chartoff

[57] ABSTRACT

Motion transmitting systems for machinery and machine tools wherein the combination of rotary and linear movement of a spindle is utilized to perform tasks especially drilling, reaming, tapping, and punching of metal. The tool supporting spindle is longitudinally threaded and powered at a preset, variable, rotary velocity. The spindle threads mesh with a linearly restrained longitudinally threaded member independently powered at a preset, variable, rotary velocity such that dissimilar angular velocities between the spindle and threaded member transmit precisely controlled advancing and retracting movement of the spindle.

13 Claims, 4 Drawing Sheets

MOTION TRANSMITTING SYSTEMS FOR MACHINERY & MACHINE TOOLS

BACKGROUND AND OBJECTS OF THE INVENTION

This invention relates to a new motion transmitting system useful in machinery and tooling, particularly, self-feeding drill and threading machines.

The art is replete with machine tools such as drill presses, tappers (for internal threading), and the like, which utilize the combination of rotary and linear motion of a cutting tool to remove material and shape a workpiece. In the past, linear movement of machine tool cutters was accomplished by a powered lead screw and gear transmission or in certain instances totally by hand. Usually, the machine operator positions the workpiece to a rotating tool and manually activates the power feed mechanism which automatically advances the tool into the workpiece. After completion of the cut, the operator disengages the power feed mechanism (or trip stops are set to accomplish this) and the tool is manually retracted from the workpiece to its starting point. This procedure is repeated until the workpiece is shaped to its finished specification.

In an attempt to improve drilling and tapping operations and adapt the process to high volume production, automatic tool advancement and retraction was introduced. Once started, the tool rapidly advances to a predetermined point; performs its work function; retracts to its original position; and shuts-off. These self-feeding drill and tapping machines generally consist of a spindle adapted to support a drill or tap which is powered rotationally by a pneumatic or electric motor and powered linearly to advance and retract by a pneumatic or hydraulic cylinder or by a rotating ball screw and stationary nut assembly. These machines require expensive power packs, fluid lines, fittings, control valves, filters, regulators, lubricators, and servo motors. In addition, they consist of many interacting parts, operate at limited spindle speeds, have inconsistent linear feed due to small bore cylinders, dissipate uncomfortable high frequency noise, and require regular rebuilding by trained maintenance personnel.

Moreover, the most accurate self-feeding tappers engage a lead screw and nut assembly with the same pitch as the workpiece to be threaded to ensure that each revolution of the spindle creates precise linear advancement of the tap. It is often found that thread cutting in various materials is impossible without the precise pitch control of lead screw tapping. However, these tappers are limited to a specific thread pitch unless they are disassembled and the desired lead screw and nut assembly interchanged, which is both time consuming and expensive.

It is, therefore, an object of the present invention to provide a new and improved motion transmitting system for self-feeding drill machines, tapping machines, and the like, which is simple, comprises few moving parts, is operable from one power source, has infinitely adjustable spindle speed, has positive, uniform, precisely controlled, linear feed, is portable, operated quietly, and requires low maintenance.

It is also an object of the present invention to provide a new and improved motion transmitting system for lead screw tapping machines wherein a single lead screw and nut assembly precisely cuts any thread pitch both unified national and metric.

It is a further object of the present invention to supply a new and improved motion transmitting system for self-feeding drill machines, tapping machines, and the like, which provides small machine shops with affordable, low cost automation.

The foregoing background and objects set forth a general view while other objects, features, and advantages will become apparent from the following description and drawings and by practice with the invention.

SUMMARY OF THE INVENTION

The motion transmitting system according to the present invention includes an elongated cylindrical spindle adapted to support a cutting tool on its forward end. This spindle is connected at its rear end to a variable speed, rotational, power means. The preferred power means is a double shafted, direct current, electric motor linearly unrestrained and held in alignment by guide blocks. The electric motor's forward shaft engages the spindle while its rear shaft is connected to an internally threaded elongate nut. The nut is in mesh at its rear end with an externally threaded rod. This rod is rotationally powered by a second variable speed means preferably a direct current electric motor which is anchored to a base plate. The base plate extends from the rear end of the second motor to the forward end of the spindle and is a slide bearing surface for the spindle rotating motor and also supports at least one spindle bushing block, limit switches, and a machine enclosure. The start, stop, and speed controls may be mounted remotely, or directly affixed to the machine. Finally, wires and plugs are provided for connections to an electric power source.

Drilling and tapping is most efficiently accomplished by using spindle speeds and linear feed rates which are optimum for each particular workpiece material. Therefore, a tachometer is utilized to precisely set the rotary speed differential (which establishes the linear feed rate) between the spindle and threaded rod motors.

The sequence of operations is begun by pressing a start button which releases current to the spindle motor resulting in rotation and rapid advancement of the cutting tool (since the threaded rod is stationary) to approximately a quarter inch from the workpiece. Upon reaching this point, a limit switch is activated causing the threaded rod motor to rotate at the correct speed differential for a prescribed feed rate. Next, the cutter plunges into the workpiece at a positive, uniform rate until it reaches its desired depth, upon which a second limit switch is activated. This second switch shuts-off current to the spindle motor resulting in rapid retraction of the cutting tool (since the threaded rod motor is still energized). Finally, upon total retraction of the tool, a third limit switch is struck which shuts-off the threaded rod motor.

A modified embodiment of the invention utilizes an anchored spindle motor mounted on one side or above the spindle. This motor transmits rotary motion to the spindle through a chain and sprocket or gear arrangement. The spindle sprocket is equipped with a key which engages a slip fit keyway in the spindle. In this manner, the spindle is positively rotated while remaining free to linearly advance and retract.

A further modification of the invention enables automated drilling and tapping operations to be performed in confined spaces. In this case, the motors and speed controls are mounted on a base plate remote from the workpiece. Rotary motion is transferred through flexible shafts to the spindle and the meshing threaded member.

DETAILED DESCRIPTION OF PREFERRED EMBODIMENTS

Figure 1:
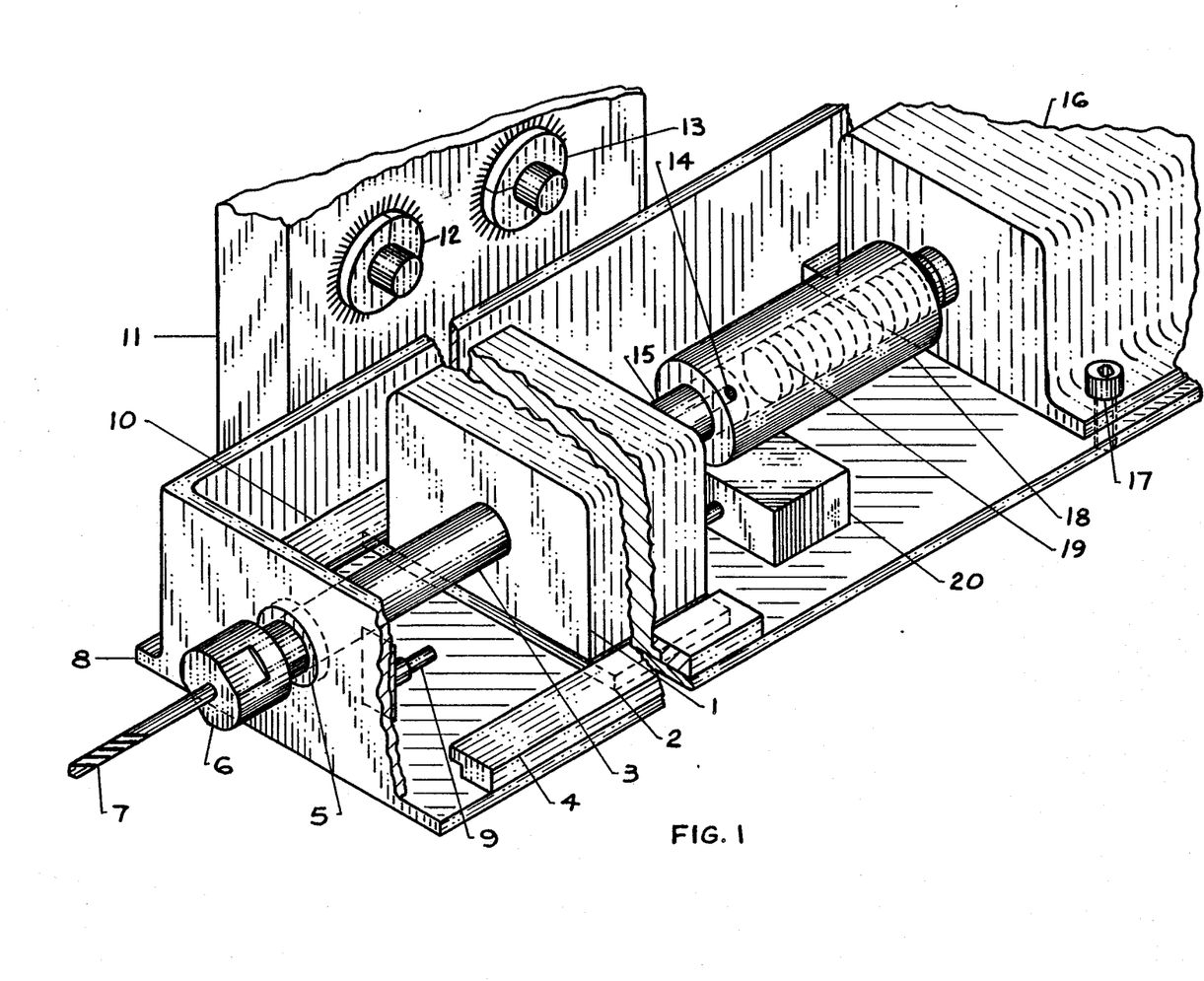
FIG. 1 is a pictorial view taken through the machine enclosure illustrating the invention in its simplest form.

Referring to FIG. 1 of the drawings, the elongate spindle 3 is circular in cross section and preferably made of turned, ground, polished, and hardened steel. The forward end of the spindle 3 is interlocked with a collet chuck 6 which aligns and supports a drill bit 7. The spindle 3 may be connected to a Jacobs chuck or any other tool holding device. In addition, the spindle 3 may be splined, keyed, threaded, or otherwise adapted to engage a machine element such as a cam, gear, lever, screw, or the like, for the purpose of transmitting motion. The spindle's rear end is connected to a variable speed power means, preferably a direct current electric motor 1.

The most serviceable embodiment of the electric motor 1 provides a forward shaft extension of approximately ¾ inch from the motor's body for attachment to the spindle's (3) rear end. In this case, the spindle 3 will be larger in diameter than the motor's shaft extension so that the spindle 3 may slip onto the extension. The motor's shaft extension and the spindle 3 are keyed together and held in place with set screws. An example of this connection is shown at the motor's rear shaft 15 which is interlocked with the nut 18 and secured with the set screw 14. The utilization of this type of connection between the spindle 3 and motor 1 provides a convenient method of disassembly and replacement of worn parts.

The electric motor 1 is mounted on a bronze wear pad 2 which seats upon the steel base plate 8. The bronze pad 2 is sandwiched in a slip fit between the base plate 8 and rail guides 4 and 10. These precision ground, hardened steel guides provide linear alignment of the electric motor 1 as it advances and retracts. In addition, the guides 4 and 10 provide support for the motor 1 when the machine is inverted or placed upon its side. The motor 1 is electrically connected to a speed controller 11 which converts alternating current to direct current through a fully rectified bridge and filter. The controller 11 is affixed with a wire and plug (not shown) for connection to an alternating current source. The spindle's (3) rotary speed is regulated by adjusting the dial 12 on the controller. The rear shaft extension 15 and the spindle 3 revolve simultaneously.

As previously stated, the rear shaft 15 is interlocked with a nut 18 and held by a set screw 14. This connection may also be splined, keyed, or pinned. The elongate nut 18 is internally threaded from its rear end at least two inches deep, preferably with acme threads. These threads are in mesh with the elongate acme threaded rod 19 which is connected to a second variable speed motor 16. The direct current electric motor 16 is securely fastened to the base plate 8 with at least four socket head cap screws 17. The motor 16 may have a front end shaft extending ¾ inch from its front face for connection to the threaded rod 19 as discussed in regard to motor 1. The speed controller 11 is electrically connected to the motor 16 and the dial 13 regulates the rotation of the threaded rod 19.

As shown in FIG. 1, the dial 12 is set for a greater speed than 13 resulting in faster rotation of the spindle 3 and nut 18, as compared with the threaded rod 19 (both motors, 1 and 16, rotate counterclockwise facing the drill 7). The rotary speed differential thus created between the nut 18 and threaded rod 19 produces forward movement of the nut 18, motor 1, spindle 3, collet 6, and drill 7. When the dial 13 is set for greater speed than 12, the threaded rod 19 rotates faster than the nut 18 (both rotate counterclockwise looking from the front) resulting in rearward movement of the drill assembly. When the dials 12 and 13 are set at the same speed, the nut 18 and rod 19 revolve at the same rate (and direction) resulting in zero linear movement of the system.

This concept is clarified by examining a simple bolt and nut. When a bolt and nut assembly is rotated about its longitudinal axis such that the bolt revolves at the same speed and direction as the nut, the distance between the two remains the same. If the bolt and nut are revolving in the same direction at dissimilar speeds, the distance between the bolt head and nut either increases or decreases depending on which one rotates faster. Thus we see that dissimilar angular velocities of meshing helical threads (rotating in the same direction) creates advancing or retracting linear movement. Since the motor 16 is anchored in place, the speed differential between the nut and threaded rod (18 and 19) transfers advancing or retracting motion to the drill 7.

The machine enclosure is mounted upon the base plate 8. The base plate 8 is provided with keys, keyways, tapped holes, clearance holes, or the like for suitable mounting. The front face of the enclosure is equipped with a bearing 5 for guiding the spindle 3. This bearing is self-lubricating bronze or TEFLON and may be held in place using a variety of methods. In FIG. 1, bearing 5 is pressed in the enclosure's front wall. Additional bearing blocks may be utilized to support longer lengths of the spindle 3.

The enclosure is equipped with ventilation holes (not shown) for motor cooling and a top lid (not shown) which bolts to the vertical walls. This top lid is slotted lengthwise to support limit switches similar to switches 9 and 20. The switches are clamped in place with screws after they are adjusted longitudinally to obtain the proper amount of rapid advancement and depth of cut. Linear movement of the motor 1 triggers the limit switches which send an electric signal through relays to the controller 11. The electric signals from the switches, start, stop, speed up, slow down, or reverse the motors (1 and 16) in proper sequence to perform the desired work function. In addition, start and emergency stop buttons (not shown) are positioned on the controller 11 or mounted remotely in a convenient place for the operator. The machine is activated by pressing the start button or the controls may be integrated into a computer circuit for precise programming of operations.

A tachometer or stroboscope is used to set the machine at the optimum spindle speed and feed for a particular work material and hole size. The motor 16 has a rear shaft extension of approximately ¾ inch to facilitate setting the speed. The following formula is used to determine the speed of the motor 16 for any desired linear feed rate:

$$X = S - (SF/P)$$

In this equation X is the spindle speed of motor 16 in revolutions per minute: S is equal to the spindle speed of motor 1 in revolutions per minute: F is the feed rate of spindle 3 in inches per revolution: and P (in inches per revolution) is equal to 1 divided by the number of threads per inch of the rod and nut 18 and 19.

Suppose for example, the rod and nut (18 and 19) have 8 threads per inch (right hand) and we wish to drill holes in a workpiece at 3,000 revolutions per minute spindle speed (motor 1) and at a 0.005 inch per revolution feed rate. These parameters are plugged into the foregoing formula as shown below to obtain the correct speed of motor 16.

$$P = \tfrac{1}{8} = 0.125 \text{ inches per revolution}$$

$$X = 3000 - \left( \frac{3000(.005)}{.125} \right)$$

X = 2880 revolutions per minute

Therefore, motor 1 is set at 3000 R.P.M. and motor 16 at 2880 R.P.M. to obtain an advancing linear feed rate of 0.005 inch per revolution or 15 inches per minute. The speed differential between the motors is 120 R.P.M.

The sequence of operations for this example is begun by pressing the start button which releases current to motor 1 resulting in rotation (counterclockwise looking from the front) at 3000 R.P.M. and rapid advancement of the cutting tool (since motor 16 is not rotating) to approximately a quarter inch from the workpiece. Upon reaching this point, a limit switch is triggered causing motor 16 to rotate in the same direction as motor 1 at 2880 R.P.M. Next, the drill plunges into the workpiece at the positive, uniform, rate of 0.005 inches per revolution until it reaches its desired depth, upon which a second limit switch is triggered. This second switch shuts-off current to motor 1 resulting in rapid retraction of the drill (since motor 16 is still energized). Finally, upon total retraction of the drill, a third limit switch is struck which shuts-off motor 16. Thus we see that automated drilling operations are performed by merely starting and stopping motors 1 and 16 at the proper time.

A stopping means is utilized to facilitate deceleration of the spindle 3 and rod 19 when the motors 1 and 16 are shut-off. The simplest means are springs (not shown) vertically mounted upon the base plate 8 such that approximately 18 pounds pressure is exerted against the nut 18 and rod 19. These springs slide against the outer diameter of the nut and rod and are held in place by studs vertically protruding from the base plate 8.

The embodiment shown in FIG. 1 is slightly modified to perform adjustable lead screw tapping (internal threading). In this case, 1 and 16 are gearmotors to ensure constant speeds and feed. In addition, the controller 11 simultaneously reverses the direction of rotation of the gearmotors 1 and 16 to remove the tap from the workpiece. This system is superior to past methods since a single lead screw and nut assembly (18 and 19) is used to tap any pitch of thread by simply adjusting the speed of the gearmotors 1 and 16.

Suppose for example, the rod and nut (18 and 19) have 8 threads per inch (right hand) and we wish to tap ¼- 20 threads per inch in a workpiece at 600 revolutions per minute spindle (3) speed. In this case, the feed rate is equal to 1 divided by 20 or 0.05 inch per revolution. These parameters are plugged into the previously discussed formula to obtain the correct speed of the gearmotor 16.

$$P = \tfrac{1}{8} = 0.125 \text{ inches per revolution}$$

$$X = 600 - \left( \frac{600(.05)}{.125} \right)$$

X = 360 revolutions per minute

Therefore, the spindle speed of gearmotor 1 is set with a tachometer at 600 R.P.M. and gearmotor 16 at 360 R.P.M. to obtain the linear feed rate of 0.05 inch per revolutions which precisely cuts 20 threads per inch in the workpiece. The direction of rotation for both gearmotors is counterclockwise looking from the front for a right hand tap.

The sequence of operations for tapping is begun by pressing the start button which releases current to gearmotor 1 resulting in rotation at 600 R.P.M. and rapid advancement of the tap (since gearmotor 16 is not rotating) to approximately a quarter inch from the workpiece. Upon reaching this point, a limit switch is triggered causing gearmotor 16 to rotate at 360 R.P.M. Next, the tap plunges into the workpiece at the positive, uniform, rate of 0.05 inch per revolution until it reaches its desired depth, upon which a second limit switch is triggered. This second switch simultaneously reverses the direction of both motors to clockwise (looking from the front) which extracts the tap from the workpiece at 0.05 inch per revolution. When the tap is fully removed from the workpiece, a third limit switch is triggered which shuts-off current to motor 16 resulting in rapid retraction of the tap (since motor 1 is still energized). Finally, upon total retraction of the tap, a fourth limit switch is struck which shuts-off motor 1. Thus we see that automated tapping operations are performed by merely starting, reversing, and stopping motors 1 and 16 at the proper time.

A modification of FIG. 1 orients the rear output shaft 15, nut 18, rod 19, and motor 16 perpendicular to the longitudinal center of the spindle 3. This right angle drive arrangement is useful when feeding a rotating tool perpendicular to its central axis such as in circular cut-off operations.

Figure 2:
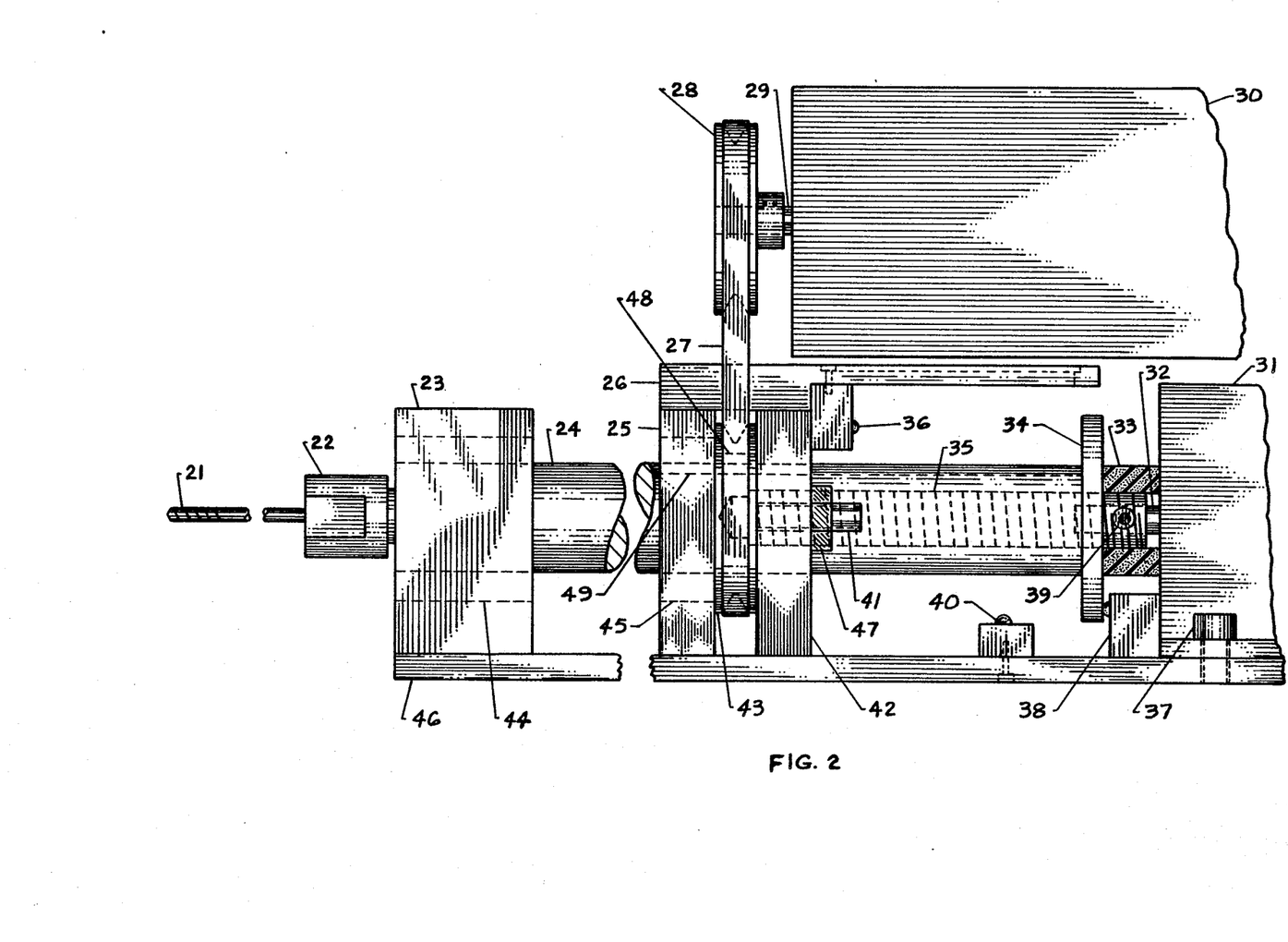
FIG. 2 is a sectional side view of a modified form of the invention.

FIG. 2 illustrates a modified form of the invention useful in a variety of applications including drilling and tapping. In this embodiment the variable speed, reversible, rotary, power means 30 and 31 are both stationary while spindle 24 moves linearly. Although the power means 30 and 31 may be air driven or hydraulic they are, preferably, direct current electric motors or gearmotors with speed controls (not shown) similar to FIG. 1. The motor 31 is keyed or pinned to the baseplate 46 and clamped in place with at least 4 socket head cap screws 37. The motor 30 is similarly supported from the enclosure (not shown).

The motor 30 is equipped with a pulley or sprocket wheel 28 which is keyed and clamped to the shaft 29. The pulley 28 transmits rotary motion through the belt (or chain) 27 to the spindle pulley 43. The pulley 43 has a key 48 engaged in a slip fit keyway 49 for positive drive of the spindle 24. The keyway 49 extends to the rear of spindle 24 and remains engaged with the key 48 as the spindle moves linearly. The pulley 43 is restrained from linear movement by the bearing block 25 on one side and the support block 42 on the other.

In another modification the spindle is equipped with an integral external groove for seating a belt. In this case a pulley is slidably mounted on the output shaft 29 of the rotary motor 30 and keyed thereto with a slip fit key and keyway. The pulley linearly slides on the output shaft while transmitting rotary motion through the belt to the spindle. The pulley and belt advance and retract simultaneously with the spindle 24.

The power means 30 and 31 may be constant speed air motors or alternating current electric motors. In this case, speed variations are obtained by using pulleys or sprockets of various different diameters. Each task requiring a different spindle speed necessitates installation of the proper diameter pulley. The power means is adjusted for each pulley diameter to obtain the proper amount of belt tension. Alternately, adjustable diameter pulleys or multiple diameter cone pulleys may be used. Many other mechanical linkages are available to obtain speed variations.

The elongate spindle 24 is circular in cross section and flanged 34 at its rear end for triggering limit switches. The forward end of the spindle 24 is interlocked with a collet chuck 22 which aligns and supports a drill bit 21. The spindle 24 is internally threaded from its rear end at least two inches deep, preferably, with acme threads. These threads are in mesh with the elongate acme threaded rod 35 which is keyed to the motor shaft 32 and secured with the set screw 39. The spindle 24 is aligned and supported with bearing blocks 23 and 25 and bearings 44 and 45.

The support block 26 is slotted so that limit switch 36 may be longitudinally adjusted and clamped thereon. The block 26 extends between the belt 27 and is bolted and pinned to 25 and 42.

A socket set screw 41 is threaded into the support block 42, on each side of the spindle 24. Jam nuts 47 are used to lock the set screws 41 in place after adjustment. These set screws 41 are solid stops used for precise depth setting of the tool in the workpiece. The set screws 41 are set to contact and stop forward movement of the flange 34, when the cutting tool has reached its extreme depth. The moment the flange 34 and stops 41 make contact the limit switch 36 triggers on the face of flange 34 retracting the tool.

A urethane stop 33 is used between the flange 34 and motor 31. The stop 33 protects the limit switch 38 and may be a mechanical spring, air cylinder, or other shock absorbing means. In certain instances, it is advantageous to equip motors 30 and 31 with a brake for instant stopping of the spindle.

The set up and operation of the embodiment of FIG. 2 is similar to that of FIG. 1. The speeds of motors 30 and 31 (for drilling and tapping) are calculated using the previously discussed formula. The speed differential between the spindle 24 and the threaded rod 35 results in precise, uniform, linear feed rates. The spindle flange 34 triggers limit switches such as 38, 40, and 36 to start, stop, speed up, slow down, or reverse the motors as previously discussed. The base plate 46 is slotted similar to 26 for longitudinal adjustment and clamping of limit switch 40. Additional limit switches are supported by the enclosure (not shown).

Figure 3:
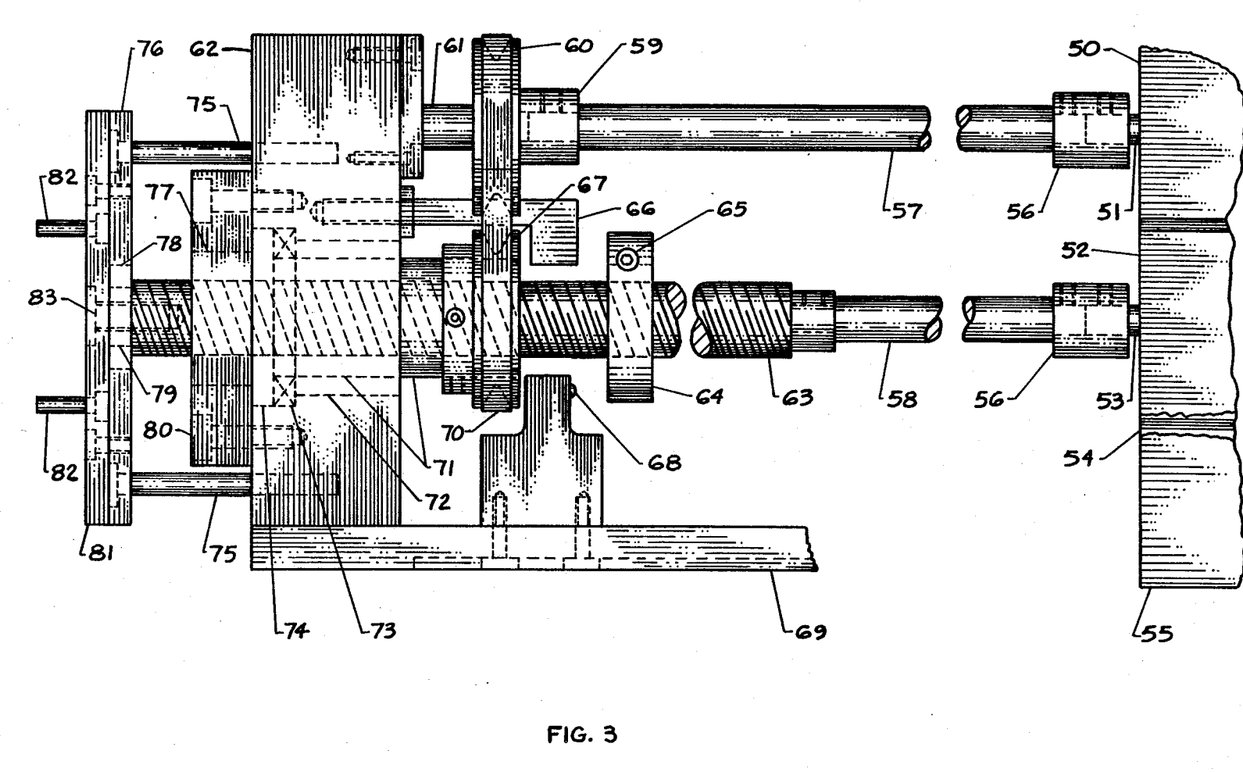
FIG. 3 is a partial plan view according to another aspect of the invention.

FIG. 3 is an embodiment of the invention useful when performing tasks in confined areas. The flexible shafts (57 and 58) permit the rotary power means (50 and 52) and the speed controls 55 to be mounted remotely upon the base plate 54. The spindle 63 is an elongate acme threaded rod which extends from the flexible shaft 58 to the punch plate 81. The spindle 63 has a threaded hole in its front face to receive the lock screw 83. The spindle's rear end is adapted to interlock and clamp to the flexible shaft 58.

The elongate nut 71 is circular in cross section and internally threaded through its entire length with acme threads which mesh with the spindle 63. The nut 71 has a flange 74 on its forward end, which slip fits into a counterbore in block 62. A pulley or sprocket wheel 67 is keyed and clamped to the nut's (71) rear end. The flange 74 is sandwiched between the thrust bearing 73 and end cap 80 for linear restraint of the nut 71. The nut 71 is aligned and supported by the bearing 72 which is pressed into the support block 62. The nut 71 is rotated in its bearing 72 by the power means 50.

The flexible shaft 57 is connected to the motor's front shaft extension 51 by the coupling 56. The front end of the flexible shaft 57 is interlocked and clamped to the pulley wheel 60 via the extension 59. The pulley wheel 60 rotates on a bearing and is supported by the arm 61. The support arm 61 is adjustable to increase or decrease tension on the belt (or chain) 70.

The flexible shaft 58 is rotated by the variable speed power means 52. This shaft 58 is connected to the motor's front shaft extension 53 by the coupling 56. The flexible shafts (57 and 58) are independently powered to establish a speed differential between the spindle 63 and nut 71.

The end cap 80 has a sleeve bearing 77 which aligns the spindle 63. The spindle 63 is turned down at its end 79 to fit into the sleeve bearing 78. The spindle (63 and 79) and lock screw 83 rotate simultaneously while the punches 82 linearly advance and retract.

The punches are aligned and supported by the punch plate 81 which is bolted and pinned to the back up plate 76. The back up plate is held in orientation by the alignment pins 75 which are accurately slip fit into the support block 62. The punch plate 81 is easily interchanged with other plates having different punch patterns and diameters.

A split collar nut 64 is threaded onto the spindle 63 and clamped in position with set screw 65. This collar nut 64 is set to trigger limit switches as the spindle 63 advances and retracts. The limit switch 68 is supported from the enclosure side wall 69 which is slotted for adjustment. Additional collar nuts and limit switches are located as necessary along the length of the spindle 63. The adjustable solid stop 66 passes between the belt 70 and provides precise tool advancement as previously discussed.

The set up and operation of this embodiment is similar to that of FIGS. 1 and 2. The speeds of motors 50 and 52 are calculated using the previously discussed formula. The speed differential between the spindle 63 and the nut 71 results in precise, uniform, linear feed rates. Collar nuts similar to 64 trigger limit switches to start, stop, speed up, slow down, or reverse the motors to perform the desired operations. The power means (50 and 52) are double shafted to operate two self-feeding drills, tappers, punchers, or the like, simultaneously.

The spindle 63 may be connected to a collet or other holding device to align and support a workpiece. In this case, the workpiece rotates and advances with the spindle while the cutting tool remains stationary. A cross slide is provided for moving the tool radially towards the center of the workpiece. This arrangement is suitable for external threading, turning, facing, or the like.

Figure 4:
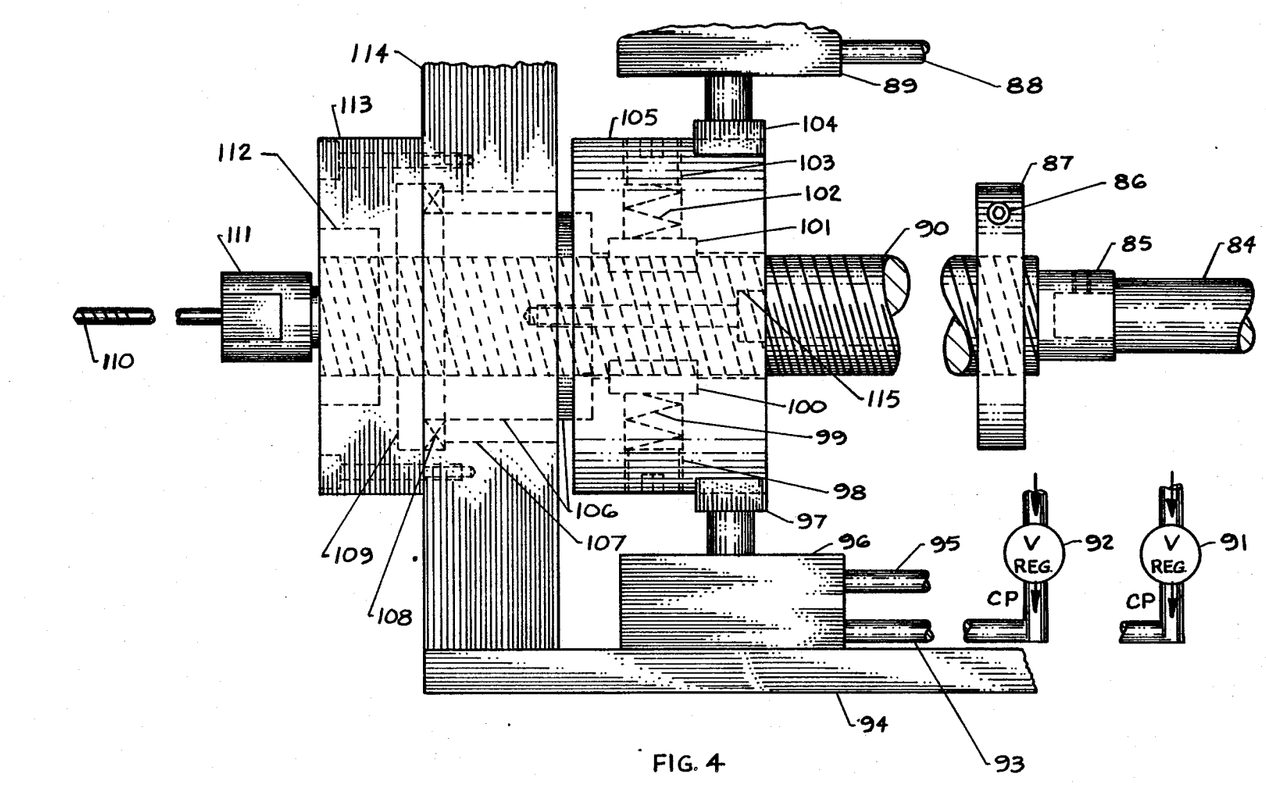
FIG. 4 is a partial side view of another modified embodiment of the invention.

FIG. 4 illustrates frictional forces being utilized to create a speed differential between meshing threads. In this case, there is only one variable speed power means (not shown), which rotates the flexible shaft 84. The flexible shaft 84 is connected to the spindle 90 via the extension 85. The spindle 90 is an elongate acme threaded rod which extends from the flexible shaft 84 to the collet chuck 111. The collet chuck 111 supports drill bit 110.

The nut 106 is circular in cross section and internally threaded through its entire length with acme threads to mesh with the spindle 90. The nut 106 is flanged 109 at its forward end and bolted to a driver 105 at its rear end. The flange 109 is sandwiched between the thrust bearing 108 and the end cap 113 for linear restraint of the nut 106. The driver 105 is bolted to the nut with screws 115.

The driver 105 is circular in cross section and has a clearance hole for the spindle through its entire length. The forward end of the driver 105 has a slip fit counterbore which mounts on the nut 106. At least four carbide grippers (100 and 101) are pressed against the spindle 90 with springs (99 and 102) backed by set screws (98 and 103). These grippers (100 and 101) are contoured to fit the spindle's (90) outside diameter. Thus the spindle 90 rotates the driver 105 (and nut 106) by frictional force applied to the grippers by the springs. The nut 106 revolves in the bearing 107 which is pressed into the support block 114. The end cap 113 has a sleeve bearing 112 for supporting the spindle 90.

Carbide grippers (97 and 104) are contoured to fit the outside diameter of the driver 105. These grippers (97 and 104) are powered by air cylinders (89 and 96). When the grippers (97 and 104) are retracted, the nut 106 rotates at the same rate as the spindle 90 resulting in zero linear movement of the cutting tool. When heavy pressure is applied to the grippers (97 and 104), the speed differential between the nut 106 and the spindle 90 is great (since the nut 106 and driver 105 stop while the spindle 90 continues to rotate slipping past grippers 100 and 101). This results in rapid advancement of the spindle 90. When light cylinder pressure is applied to the grippers (97 and 104), a slight speed differential is set up between the nut 106 and spindle 90. This results in linear feed of the cutting tool. Therefore, the linear feed of the spindle 90 is controlled by the pressure applied to the grippers (97 and 104).

Control of the cylinders (96 and 89) for any particular linear feed rate is achieved by the preset pressure regulators 91 and 92. These regulators are connected to the inlet lines (93). Cylinder air is exhausted through lines (95 and 88). Several split collars 87 are located along the length of the spindle 90 and clamped thereon with screws 86. The regulators (91 and 92) are activated for the desired machine operation by limit switches (not shown) which are triggered by the collars 87. The linear feed rate of the cutting tool is adjusted by increasing or decreasing air pressure at the regulators (91 and 92). In this case, the spindle is retracted by reversing the power means.

The power means for this invention may be equipped with a digital speed readout in revolutions per minute. This enables the operator to set the desired speeds quickly and to observe the speeds under cutting loads.

Another feature of the power means for this invention is synchronization. In this case, two motors maintain their set speeds under load. This advantage is particularly important when performing adjustable lead screw tapping operations.

Various modifications and changes may be made in the motion transmitting system of the present invention, within the scope of the appended claims, without departing from the spirit of the invention. For example, the meshing threads may be square, buttress, unified, or ball screws may be used. Moreover, any type motor having various mounting styles may be utilized for the power means. Further, various speed controls may be utilized to achieve a speed differential. Those modifications mentioned above are but a few which may be resorted to in constructing the improved motion transmitting system of the present invention.

I claim:

1. A motion transmitting system comprising:
    an elongated spindle connected at its forward end to a tool carrier means;
    said spindle being connected at its rear end to a front output means of a first rotary power means, which rotates said spindle about its longitudinal axis;
    said first rotary power means having a rear output means, which is generally opposite of said front output means;
    an elongated first connector is connected to said rear output means of said first rotary power means, which rotates said first connector about its longitudinal axis;
    said first connector having at least one helical groove with corresponding ridges spiralling longitudinally thereof;
    an elongated second connector having at least one helical groove with corresponding ridges spiralling longitudinally thereof, which are engaged with said first connector's helical grooves and ridges;
    said first and second connector's helical grooves fitting slidably into one another's helical ridges such that dissimilar angular velocities between said first and second connector create longitudinal linear motion therebetween;
    said second connector being connected to a second rotary power means which rotates said second connector about its longitudinal axis;
    means anchoring said second rotary power means in a functionally engaging relationship with the system;
    means restraining said second connector from linear movement while simultaneously permitting angular velocity thereof about its longitudinal axis;
    supporting means;
    said spindle, said first rotary power means, and said first connector move linearly in unison when first and second connectors rotate at said dissimilar angular velocities;
    bearing means including between said first rotary power means and at least one supporting surface;
    said first rotary power means being retained in alignment against a supporting means by at least one retaining means, which permits linear movement in a predetermined direction relative to the longitudinal axis of said spindle;
    enclosing means;
    shock-absorbing means;
    stopping means controlling linear movement;
    angular velocity control means;

angular velocity brake means;
said first rotary power means being prearranged to rotate a predetermined amount faster than said second rotary power means;
said first and second rotary power means rotating in the same direction;
a sequence of operations as follows: first, activation of said first rotary power means resulting in rapid advancement of said spindle to a first predetermined position; second, activation of said second rotary power means resulting in feed advancement of said spindle to a second predetermined position; third, deactivation of said first rotary power means resulting in rapid retraction of said spindle to a third predetermined position; fourth, deactivation of said second rotary power means, thus completing a cycle;
and control means for said sequence of operations.

2. A motion transmitting system as recited in claim 1, wherein said first rotary power means is repeatedly deactiviated and activated and said second rotary power means is repeatedly deactivated and activated relative to the deactivation and activation of said first rotary power means.

3. A motion transmitting system as recited in claim 1, wherein said spindle is aligned and supported by at least one bearing means supported by a structural member.

4. A motion transmitting system as recited in claim 1, wherein said first and second rotary power means are variable velocity rotary motors each being independently in communication with an angular velocity control means.

5. A motion transmitting system as recited in claim 1, wherein said first and second rotary power means are gear motors.

6. A motion transmitting system as recited in claim 1, wherein said first and second rotary power means are non-variable velocity rotary motors;
said first rotary power means having a faster angular velocity than said second rotary power means by a predetermined amount.

7. A motion transmitting system as recited in claim 1, wherein said meshing helical grooves and ridges are internal threads for one member and external threads for the other member of the connection.

8. A motion transmitting system as recited in claim 1, wherein said retaining means for said first rotary power means encases at least a portion relative to said first rotary power means;
and said encasement having bearing contact against said portion relative to said first rotary power means permitting linear movement of said first rotary power means relative with the longitudinal axis of said spindle while simultaneously prohibiting nonfunctional movement thereof.

9. A self-feeding lead screw threading machine comprising:
an elongated spindle connected to a tool carrier means;
said spindle being in communication with an output means of a first rotary power means which rotates said spindle about its longitudinal axis;
said spindle being in structural relationship with at least one helical groove with corresponding ridges spiralling longitudinally thereof such that angular velocity of said spindle about its longitudinal axis correlates with angular velocity of said helical grooves and ridges;
a member in structural relationship with at least one helical groove with corresponding ridges spiralling longitudinally thereof, which are engaged with said spindle's helical grooves and ridges;
said spindle's and said member's helical grooves fitting slidably into one another's helical ridges such that dissimilar angular velocities between said spindle and said member create longitudinal linear motion therebetween;
said member being in communication with an output means of a second rotary power means, which rotates said member about its longitudinal axis;
means anchoring said second rotary power means in a functionally engaging relationship with the machine;
means restraining said member from linear movement while simultaneously permitting angular velocity thereof about its longitudinal axis;
stopping means controlling linear movement;
angular velocity control means;
said first rotary power means being prearranged to rotate a predetermined amount faster than said second rotary power means;
said first and second rotary power means rotating in the same direction;
a sequence of operations as follows: first, activation of said first rotary power means resulting in rapid advancement of said spindle to a first predetermined position; second, activation of said second rotary power means resulting in feed advancement of said spindle to a second predetermined position; third, simultaneous reversal of said first and second rotary power means resulting in feed retraction of said spindle to a third predetermined position; fourth, deactivation of said second rotary power means resulting in rapid retraction of said spindle to a fourth predetermined position; fifth, deactivation of said first rotary power means, thus completing a cycle;
and control means for said sequence of operations.

10. A motion transmitting system comprising:
an elongated spindle connected to a tool carrier means;
said spindle being in communication with an output means of a first rotary power means, which rotates said spindle about its longitudinal axis;
said spindle being in structural relationship with at least one helical groove with corresponding ridges spiralling longitudinally thereof such that angular velocity of said spindle about its longitudinal axis correlates with angular velocity of said helical grooves and ridges;
a member in structural relationship with at least one helical groove with corresponding ridges spiralling longitudinally thereof, which are engaged with said spindle's helical grooves and ridges;
said spindle's and said member's helical grooves fitting slidably into one another's helical ridges such that dissimilar angular velocities between said spindle and said member create longitudinal linear motion therebetween;
said member being in communication with an output means of a second rotary power means, which rotates said member about its longitudinal axis;
means anchoring said second rotary power means in a functionally engaging relationship with the system;

means restraining said member from linear movement while simultaneously permitting angular velocity thereof about its longitudinal axis;

stopping means controlling linear movement;

angular velocity control means;

and a sequence of operations being accomplished by activating and deactivating, at least partially, said rotary power means.

11. A motion transmitting system as recited in claim 10, wherein said first rotary power means being prearranged to rotate a predetermined amount faster than said second rotary power means;

said first and second rotary power means rotating in the same direction;

the sequence of operations as follows: first, activation of said first rotary power means resulting in rapid advancement of said spindle to a first predetermined position; second, activation of said second rotary power means resulting in feed advancement of said spindle to a second predetermined position; third, deactivation of said first rotary power means resulting in rapid retraction of said spindle to a third predetermined position; fourth, deactivation of said second rotary power means, thus completing a cycle;

and control means for said sequence of operations.

12. A motion transmitting system as recited in claim 10, wherein said meshing helical grooves and ridges are internal threads for one member and external threads for the other member of the connection.

13. A motion transmitting system as recited in claim 10, wherein said first and second rotary power means are variable velocity rotary motors each being independently in communication with an angular velocity control means.

* * * * *